(12) United States Patent
Kai

(10) Patent No.: US 6,576,079 B1
(45) Date of Patent: Jun. 10, 2003

(54) WOODEN TILES AND METHOD FOR MAKING THE SAME

(76) Inventor: Richard H. Kai, 3181 S. Emerson St., Englewood, CO (US) 80110

( * ) Notice: Subject to any disclaimer, the term of this patent is extended or adjusted under 35 U.S.C. 154(b) by 138 days.

(21) Appl. No.: 09/672,554

(22) Filed: Sep. 28, 2000

(51) Int. Cl.[7] .................. B32B 21/00; B32B 21/14; B27D 1/00
(52) U.S. Cl. .............. 156/182; 156/250; 156/256; 428/220; 428/537.1; 144/346; 144/350
(58) Field of Search .................. 156/182, 154, 156/153, 250, 256; 52/384; 428/44, 45, 51, 537.1, 220; 144/345, 350, 346

(56) References Cited

U.S. PATENT DOCUMENTS

| | | | |
|---|---|---|---|
| 3,969,558 A | * 7/1976 | Sadashige | 144/346 |
| 3,989,609 A | 11/1976 | Brack | |
| 4,103,056 A | * 7/1978 | Baratto et al. | 428/106 |
| 4,122,878 A | * 10/1978 | Kohn | 144/350 |
| 4,273,912 A | * 6/1981 | Harmer | 428/423.1 |
| 4,731,140 A | 3/1988 | Yontrarak | |
| 5,322,584 A | 6/1994 | Severson et al. | |
| 5,618,371 A | * 4/1997 | Sing | 144/345 |
| 5,747,177 A | * 5/1998 | Torimoto et al. | 264/109 |
| 5,863,632 A | 1/1999 | Bisker | |

FOREIGN PATENT DOCUMENTS

| | | | | |
|---|---|---|---|---|
| GB | 2101523 A | * | 1/1983 | B27M/3/00 |
| JP | 01215502 A | * | 8/1989 | B27M/3/00 |

OTHER PUBLICATIONS

Translation of the abstract of JP 1–215502.

* cited by examiner

Primary Examiner—Richard Crispino
Assistant Examiner—Sue A. Purvis
(74) Attorney, Agent, or Firm—Nellie C. Kaufman, Esq.

(57) ABSTRACT

Wooden tiles and a method for making the same is disclosed. The wooden tiles are sliced from a rectangular, elongate composite beam which is formed by assembling and securely adhering together a plurality of elongate wood pieces and possibly one or more non-wood products. The beam is then sliced into individual tiles having a substantially uniform tile thickness and a predetermined pattern of primarily end grain wood which is substantially consistent among all of the tiles.

5 Claims, 6 Drawing Sheets

WOODEN TILES AND METHOD FOR MAKING THE SAME

FIELD OF THE INVENTION

The present invention relates generally to mass-produced decorative tiles comprising mostly wood products and methods for making the same, and more particularly to wooden tiles comprising different species of end grain wood products and methods for making the same.

BACKGROUND OF THE INVENTION

Wooden tiles have long been utilized as a floor covering, ceiling or wall covering, a border for carpeted floors, and for other decorative purposes. It is generally considered that end grain wood is superior to flat grain wood with regard to many of these applications. For example, end grain wood is substantially more durable than flat grain wood, especially with regard to floor tiles. Thus, wooden tiles having a front or "wearing" surface which is substantially comprised of end grain wood are much more durable than those comprised of flat grain wood. Additionally, the appearance of end grain wood is unique in that a pattern of tree growth rings is revealed in the grain, as opposed to the more common "cathedral" grain pattern of flat grain wood.

Wooden tiles known as "parquetry" (for floor tiles) or "marquetry" (for other decorative purposes) generally comprise small pieces of wood which are manually arranged and adhesively bonded together to form each individual tile. Methods for making parquetry are shown in U.S. Pat. No. 4,731,140 dated Mar. 15, 1988 of Yontrarak for WOODEN TILE AND METHOD FOR MAKING THE SAME and U.S. Pat. No. 5,322,584 of Severson et al. for METHOD FOR MAKING WOODEN TILE, which are hereby incorporated by reference for all that is contained therein. It is noted in each of these patents that, while end grain wood is much more durable than flat grain wood, it also tends to be less flexible. Thus, using standard parquetry methods, tiles created with small pieces of end grain wood tend to break apart more easily than those made of flat grain wood. These patents attempt to improve on methods for assembling the small pieces of wood to create wooden tiles which are more flexible and stable.

Regardless of the improvements shown in these patents, the methods for making a parquetry or marquetry-type of wooden tile which involve manually assembling small pieces of wood to create individual tiles are extremely time-consuming and labor-intensive. Furthermore, since each tile is individually assembled using separately-cut pieces of wood, any two tiles produced are highly likely to have at least some inconsistencies in their surface patterns. In addition, there is a limit to the details which may be included in a parquetry or marquetry-type of wooden tile in that the individually-cut pieces of wood which make up the tile must be thick enough to be easily assembled. Thus, no thin lines of wood or other such inlay can reasonably be included in a wooden tile produced by standard methods without prohibitively raising the cost of such tile. Finally, as noted above, for tiles comprised of end grain wood pieces, special steps must be taken to assemble a tile which is more flexible and stable.

Thus, it is an object of the present invention to provide a method for efficiently making a plurality of wooden tiles.

It is another object of the present invention to provide a method for making a plurality of wooden tiles each having a front or "wearing" surface substantially comprised of end grain wood, and most preferably a variety of different species of end grain wood. The resulting wooden tiles are stable and should not easily break apart.

It is another object of the present invention to provide a method for making a plurality of wooden tiles having wood and/or non-wood inlays.

It is a further object of the present invention to provide a method for making a plurality of wooden tiles having a consistent surface pattern thereon.

SUMMARY OF THE INVENTION

The present invention is directed to wooden tiles and a method for making the same. The wooden tiles are sliced from an elongate composite beam having a rectangular cross-sectional shape. The elongate composite beam is formed by assembling and securely adhering together a plurality of elongate wood and possibly one or more non-wood pieces. The beam is then sliced into individual tiles having a substantially uniform tile thickness and a predetermined pattern of primarily end grain wood which is substantially consistent among all of the tiles.

The elongate wood pieces are pre-finished within a predetermined tolerance in order to form the elongate composite beam. Adhesive is applied to at least some of the elongate wood pieces and allowed to completely cure prior to slicing the tiles. The tiles may be individually finished by applying a tinted stain and/or clear coating on the front surface of each tile. An adhesive backing may be placed on the rear surface of each tile to create a plurality of self-adhesive tiles.

Different types of wood and non-wood product may be used in order to create an infinite variety of patterns. The elongate wood pieces preferably comprise at least two different species of wood to provide multi-colored tiles. Plywood may be used to create a "striped" effect, and exotic woods may be included in small amounts to create an expensive-looking, yet low-cost tile. Cylindrical dowels made of wood or non-wood product may also be inserted into the elongate composite beam.

Tiles having curved pieces of wood or non-wood product therein may be produced by the method of the present invention. Curved edges are cut into one or more elongate wood pieces, and a thin, flexible, elongate sheet of wood or non-wood product is placed between the curved edges.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
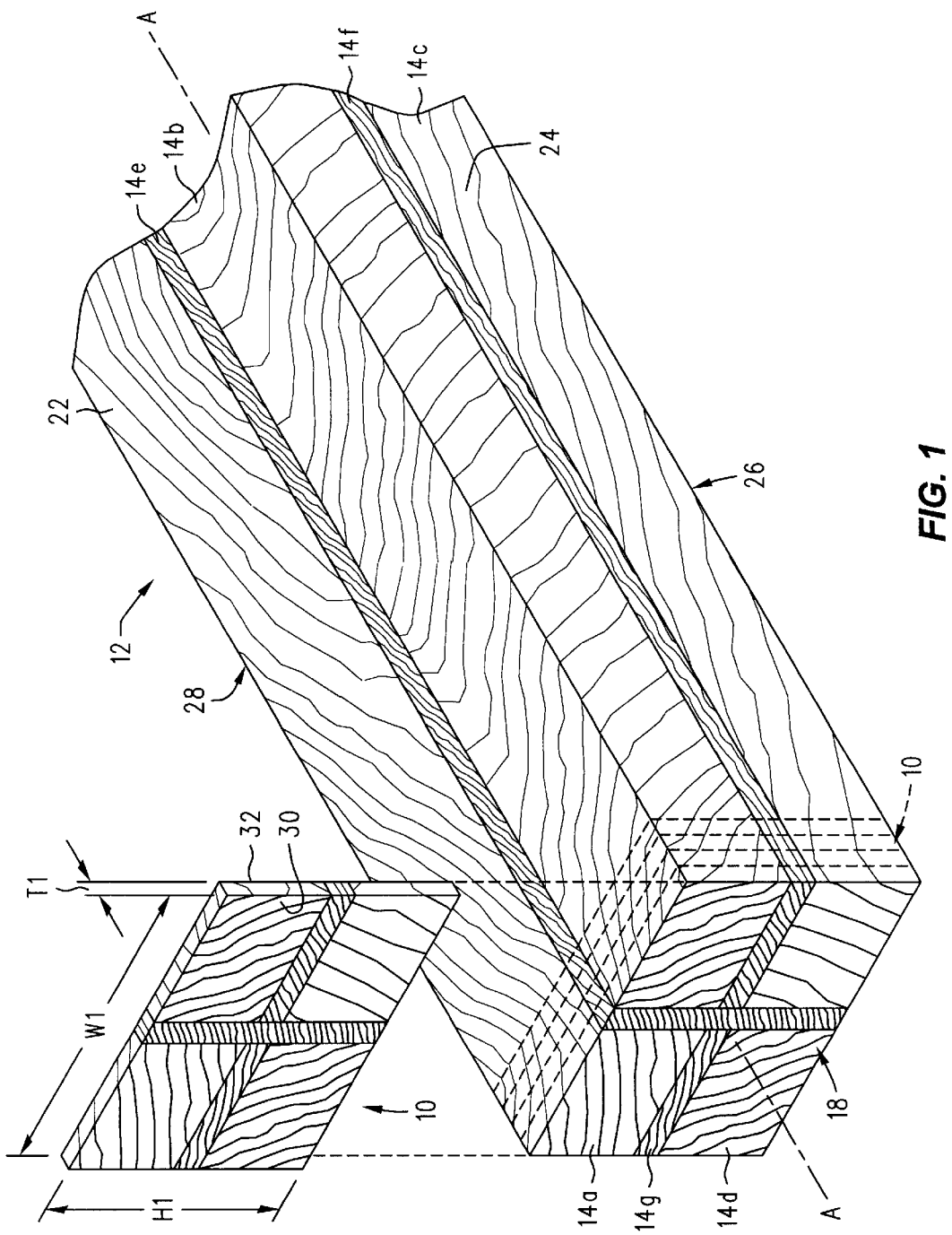
FIG. 1 is an isometric view of an elongate composite beam and wooden tile sliced therefrom.

The present invention is directed to a unique method for making a plurality of wooden tiles 10 from an elongate composite beam 12, FIG. 1. The elongate composite beam 12 is made up of pre-assembled and pre-adhered elongate wood beams, boards, laminate, veneer, or the like 14*a–g*. The elongate wood beams, boards, planks, laminate, veneer, or the like will be hereinafter referred to collectively as "elongate wood pieces". The term "elongate wood pieces" is not intended to refer to the small, laterally-oriented pieces of wood which are traditionally cut and assembled for individual tiles. The elongate wood pieces referred to herein are longitudinally oriented (e.g., perpendicular to each tile surface). The term "elongate" refers to a longitudinal length which is equal to a plurality of tile thicknesses.

Figure 2:
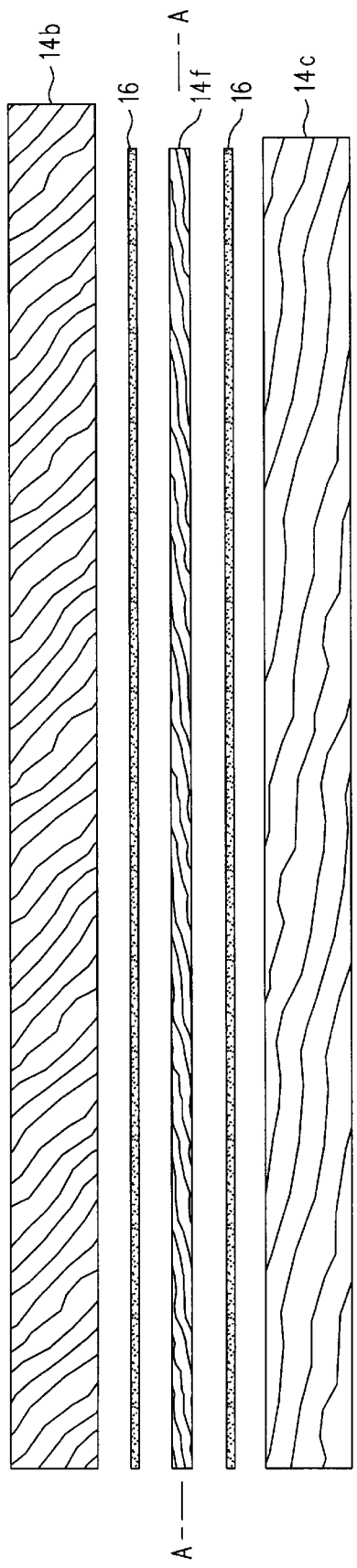
FIG. 2 is a side exploded view of a plurality of elongate wood pieces with adhesive layers therebetween.

As best shown in FIG. 2, in one embodiment of the invention, a plurality of pre-finished elongate wood pieces 14*a–g* (elongate wood piece 14*e* is not shown for clarity) are assembled in a longitudinal orientation along axis AA, which is generally perpendicular to each tile surface (e.g., 30, FIG. 1). The elongate wood pieces 14*a–g* are securely adhered together using a standard adhesive 16 such as polyvinyl acetate ("PVA") or polyurethane ("PUR") adhesives. The adhesive 16 is allowed to cure in a manner well-known in the art, thereby forming the elongate composite beam 12, FIG. 3, having a first end 18 and a second end 20. Subsequently, the beam 12 is cross-sectionally sliced using standard wood cutting tools into individual tiles 10 as indicated by dashed lines in FIG. 3.

The elongate composite beam 12 shown in FIG. 1 has a rectangular cross-sectional shape which is the most preferable shape for tiles, whereby "rectangular" as used in the present application includes "square". Prior to assembling and adhering the elongate wood pieces 14*a–f*, the elongate wood pieces are individually machined and pre-finished to specific tolerances so that, when assembled, a beam 12 is formed with the desired rectangular cross-sectional shape. The beam 12 may have a height "H1" and a width "W1" and may be sliced a thickness "T1" in order to produce tiles 10 having a front surface 30 and a rear surface 32, either of which may be the front or "wearing" surface of the tile since these surfaces 30, 32 are identical. Since the tiles are sliced cross-sectionally, i.e., perpendicularly to any elongate major (i.e., non-end) surface 22, 24, 26, 28 on the beam, a uniform thickness "T1", the shape of each surface 30, 32 is the same as the cross-sectional shape of the beam. The dimensions "H1 by W1" of each tile 10 may be a standard tile size such as 4 inches by 4 inches, 6 inches by 6 inches, 12 inches by 12 inches, 6 inches by 8 inches, etc. The thickness "T1" of each tile 10 is also preferably a standard tile thickness which can range from approximately 1/32 inch to 3/4 inch, or most preferably approximately 1/4 inch.

By slicing the tiles 10 from the elongate composite beam 12, the surface 30 of each of the resulting tiles 10 are substantially comprised of end grain wood, which is known in the art as being superior to flat grain wood as noted above. Since the elongate wood pieces are pre-assembled and pre-adhered, with the adhesive being allowed to cure prior to slicing the tiles from the beam, the resulting tiles are far more stable than tiles created using traditional methods. Thus, while the wooden tiles of the present invention are ideal for use as floor tiles (i.e., parquetry), the wooden tiles of the present invention may be utilized in any decorative tile application such as marquetry, wall or ceiling tiles, or the like.

Figure 3:
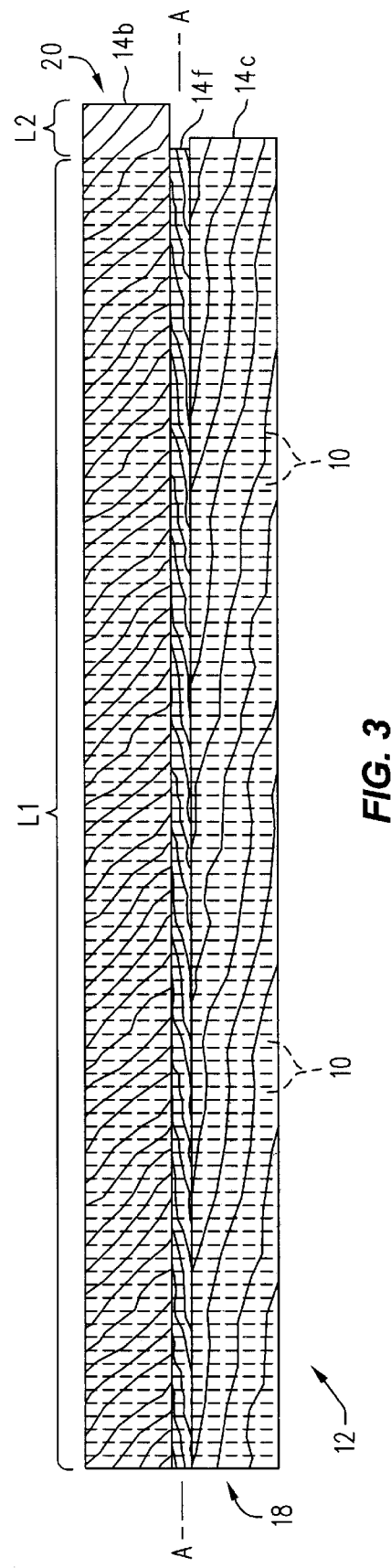
FIG. 3 is a side view of an elongate composite beam and wooden tiles sliced therefrom shown in dashed lines.

While a particular surface pattern and elongate wood pieces are shown in FIGS. 1–3, it can be appreciated that any combination of elongate wood pieces may be utilized in the present invention to create an infinite variety of surface patterns. Specifically, the elongate wood pieces may be comprised of any combination of wood beams, boards, planks, laminate, veneer, or the like having any width and height dimensions. The elongate wood pieces may be any longitudinal length, and the individual elongate wood pieces (e.g., 14*b, c, f*, FIG. 3) need not be the same length. As noted above, the term "elongate" as used herein refers to a longitudinal length which is equal to at least several times the thickness "T1", FIG. 1, of each tile 10, and most preferably one to six feet (or longer, if weight of the beam is not an issue). The usable longitudinal length "L1", FIG. 3, of the beam 12 is the length of beam which may be sliced into tiles 10, which is usually slightly less than the length of the shortest piece of wood 14*f* as shown in FIG. 3. The remaining length "L2" of beam 12, if any, is scrap. When the elongate wood pieces 14*a–g* are assembled to form the beam 12, the elongate wood pieces 14*a–g* are preferably aligned on at least one end 18 of the beam (which is the end from which the first tile is sliced) as shown in FIG. 3. To minimize the amount of scrap, it is most preferable to use elongate wood pieces 14*a–g* having the same length. The usable length "L1" of the beam 12 and the desired thickness "T1" (FIG. 1) of each tile determines how many tiles 10 may be sliced from a single beam 12. For example, if 1/4 inch tiles are sliced from a beam with a usable length of approximately 4 feet, then up to 192 tiles may be produced from the beam. It can be appreciated that in order to manually assemble 192 tiles, even with the simplest parquet surface pattern, would be considerably more time-consuming and labor-intensive. It is estimated that the method of the present invention produces tiles 75% more efficiently than any standard method involving assembling individual tiles, with the rate of efficiency being higher as more tiles are produced from a single beam. This is due to the fact that the elongate wood pieces of the present invention need only be assembled and adhered once in order to produce a plurality of tiles from a single beam. With standard methods, the small, laterally-oriented wood pieces must be separately assembled and adhered for each individual tile.

A variety of different species of wood may be utilized in the elongate composite beam 12 to create different surface patterns on the wooden tiles 10. For example, FIG. 1 shows four generally rectangular elongate wood pieces 14*a–d* which may be, for example, a light-colored wood such as maple, sandwiching three pieces 14*e–g* of darker wood such as, for example, walnut. The tiles 10 may be finished on the "wearing" surface (e.g. front surface 30) by lightly sanding the surface 30 to provide a smooth surface and to bring each tile to an even thickness. A clear polyurethane varnish may then be applied to the surface 30 of each tile 10, which generally has the effect of bringing out the beauty of most wood, especially end grain wood. For example, end grain walnut becomes nearly black when coated with a clear varnish, while ash and maple become almost pure white. Exotic woods such as purple heart and padauk have very interesting colors and patterns which emerge when clear varnish is applied to their end grain surfaces. To provide different color combinations, a tinted varnish or stain and clear varnish may be applied to each of the tiles 10. Finally, an adhesive backing may be applied to the surface (e.g., the rear surface 32) opposite the "wearing" surface of each tile 10 to create a self-adhesive tile which is designed to be installed by a home owner and is commonly sold at "do-it-yourself" home improvement centers.

Figure 4:
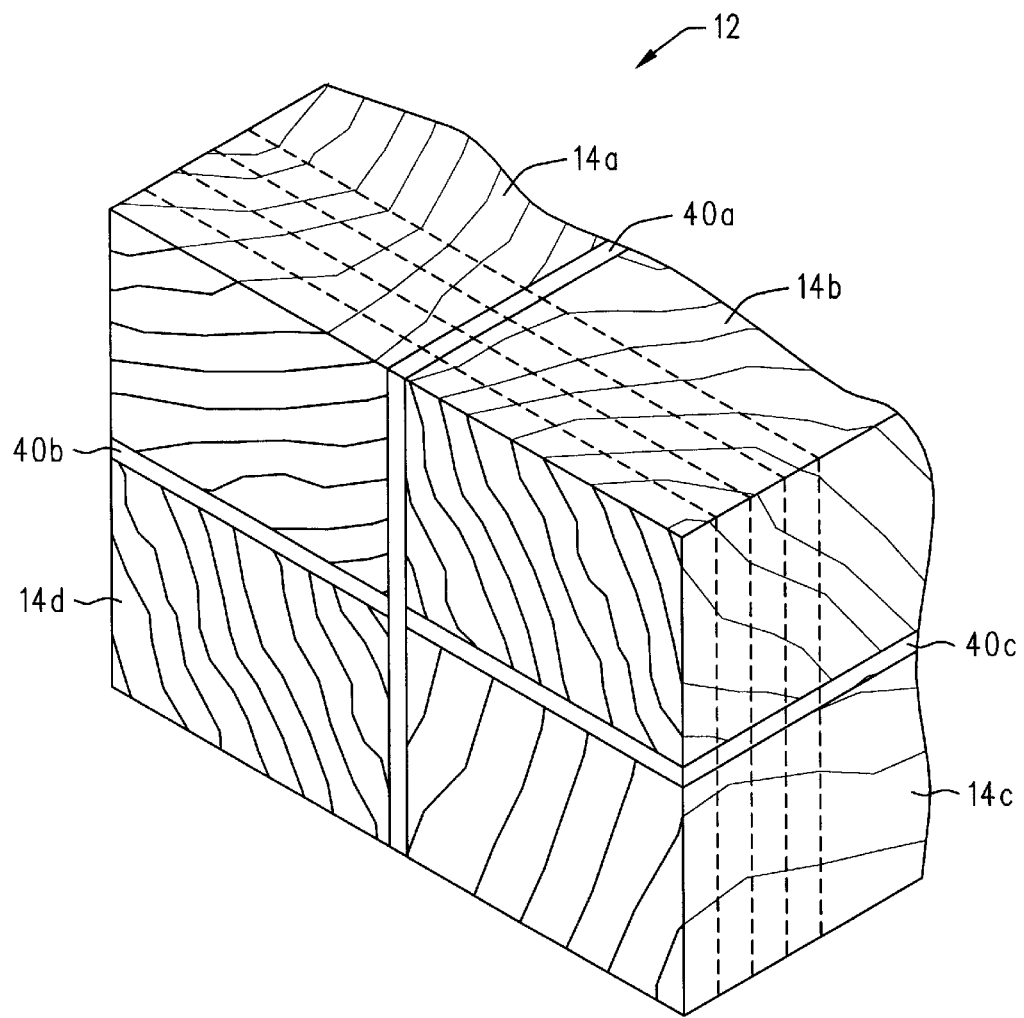
FIG. 4 is an isometric view of an elongate composite beam having very thin wood or non-wood products therein.

In another embodiment of the invention shown in FIG. 4, one or more elongate pieces of non-wood product 30*a–c* may be assembled and adhered along with elongate wood pieces 14*a–d*, thereby producing a tile which is primarily end grain wood with an "inlay". The non-wood product is preferably slicable using standard wood cutting tools such as a bandsaw, cross cut saw, or the like so that special tools need not be used to slice the tiles. This may be accomplished by using very thin sheets of non-wood product such as, for example, brass, aluminum, an acrylic polymer blend (e.g., "Corian"), or any material desirable for use in a particular tile application (floor, ceiling, etc.). These sheets of non-wood product may be, for example, as thin as approximately 1/50 inch, or as thick as approximately 3/4 inch.

Alternatively, any or all of the "inlay" pieces 30*a*–*c* described above may be very thin elongate wood pieces such as laminate or veneer. For example, these thin wood pieces may be comprised of exotic wood such as purple heart or padauk, thereby providing a tile with an expensive-looking inlay for very little cost. It can be appreciated that, if it were even possible to manually produce a tile with such an "inlay" using prior art methods, it would be extremely difficult to manually assemble the small, laterally-oriented wood pieces and the very thin wood or non-wood pieces into a tile. Thus, the present invention provides a method to mass-produce tiles having intricate patterns and/or thin inlays.

FIGS. 5–10 show some of the infinite variety of patterns which can be created using the method of the present invention (the wood grain surface pattern was removed from these figures for clarity). Most, if not all, of these patterns would be very time-consuming and labor-intensive to create using prior art methods.

Figure 5:
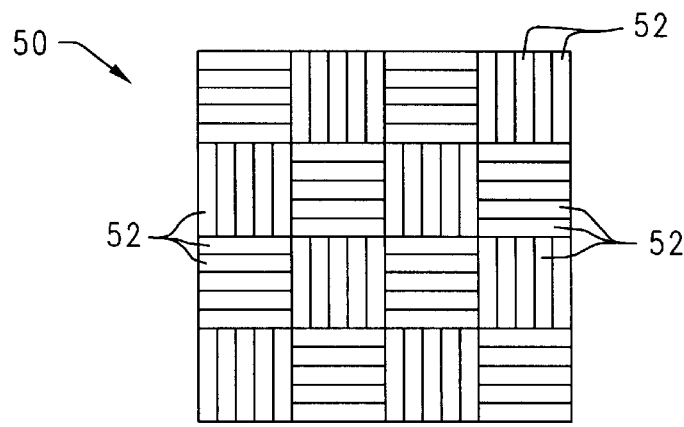
FIGS. 5–10 are front views of wooden tiles produced by the method of the present invention.

FIG. 5 illustrates a standard parquet tile 50 created using the method of the present invention. This tile 50 may be made using a plurality of elongate wood pieces, e.g., 52, arranged in an alternating lateral orientations as shown. The elongate wood pieces 52 may be substantially identical, or, alternatively, the elongate wood pieces 52 may be comprised of different species of wood as discussed above in order to create a multicolored tile. Also as discussed above, since the longitudinally-oriented elongate wood pieces 52 are assembled and adhered together prior to slicing the tiles, the parquet tile 50 of the present invention is much more stable and durable than standard parquet tiles which are comprised of small, laterally-oriented wood pieces that are assembled and adhered together for each individual tile. In addition, it can be appreciated that the amount of time required to assemble eighty or so small, laterally-oriented wood pieces into the parquet tile 50 using standard methods would be considerable. However, with the present invention, the eighty or so elongate wood boards or planks 52 need only be arranged and adhered once in order to produce a plurality of tiles. In addition, the surface pattern would be much more consistent utilizing the method of the present invention since a plurality of tiles are sliced from a single elongate beam.

Figure 6:
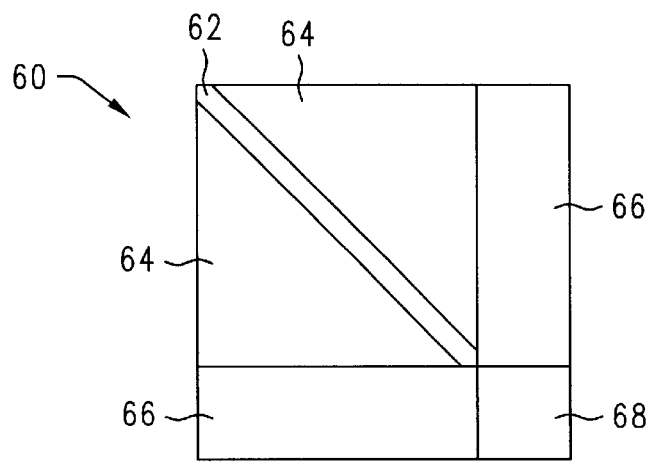

FIG. 6 illustrates a tile 60 which is asymmetrical and is comprised of a horizontally-oriented elongate piece of wood or non-wood product 62, triangular-shaped elongate wood pieces 64, rectangular elongate wood pieces 66, and a square wood piece 68.

Figure 7:
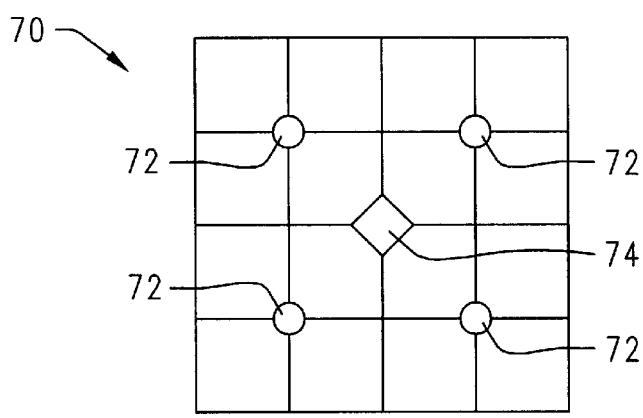

FIG. 7 illustrates a tile 70 which has round and diamond-shaped inlays. These inlays may be comprised of cylindrical, elongate wood or non-wood dowels 72 and a rectangular (including square) elongate piece of wood or non-wood product 74 which is rotated as shown to create a diamond-shaped inlay.

Figure 8:
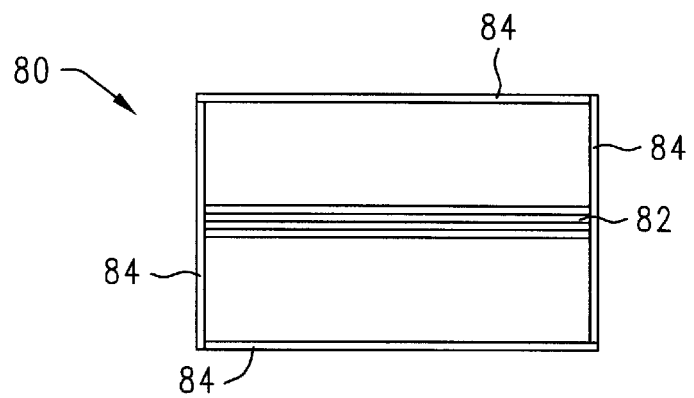

FIG. 8 illustrates a tile 80 having a "striped" appearance which may be created either by using an elongate piece 82 of plywood or, alternatively, several elongate wood pieces sandwiched together. Thin pieces of wood or non-wood product 84 may be arranged on the major surfaces 22, 24, 26, 28 of the beam 12 as shown in order to create a "border" effect on the tile 80.

Figure 9:
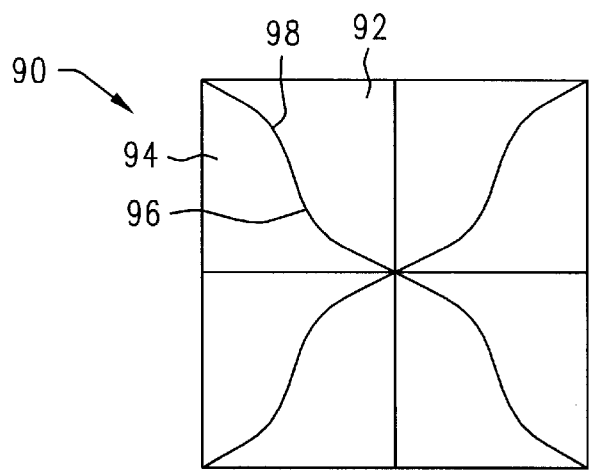

FIG. 9 illustrates a tile 90 which may be created by using elongate wood pieces, e.g., 92, 94, which have been finished on one side thereof with a molder or the like, creating curved edges, e.g., 96, 98. One curved edge, e.g., 96, may be created using a "female" milling head, while the other curved edge, e.g., 98 may be created by using an opposite, or "male" milling head. It can be appreciated that this method can create many "flower petal-type" designs as shown in FIG. 9.

Figure 10:
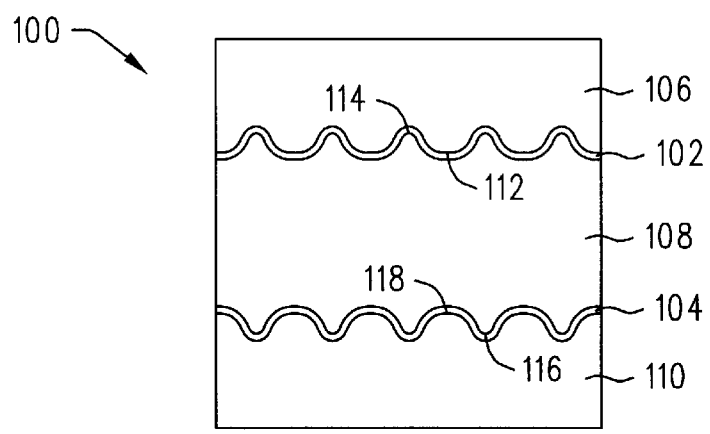

FIG. 10 illustrates a tile 100 having thin, curved, elongate pieces 102, 104 of wood or non-wood product sandwiched between thicker elongate wood pieces 106, 108, 110. Such a tile 100 may be created by first cutting curved edges 112, 114, 116, 118 into the thicker elongate wood pieces 106, 108, 110 using a molder or the like. Then, a thin, flexible, elongate sheet of laminate, veneer, or non-wood product 102, 104 may be pressed onto and adhered to one of the curved edges 112, 114, 116, 118. An adjoining elongate wood piece is then adhered to the laminate, etc. It will be appreciated by those skilled in the art that creating tiles with curved thin, curved details as shown in FIG. 10 would be extremely time-consuming and cost-prohibitive using standard methods, while the method of the present invention makes it rather easy to create a tile with such curved wood or non-wood details.

While specific surface patterns are shown in FIGS. 1–10 and described above, it is to be understood that the method of present invention is capable of producing an infinite variety of surface patterns. Furthermore, any of these patterns may be altered by utilizing different elongate wood pieces and/or pieces of non-wood product, different species of wood, different colored stains, etc.

Figure 11:
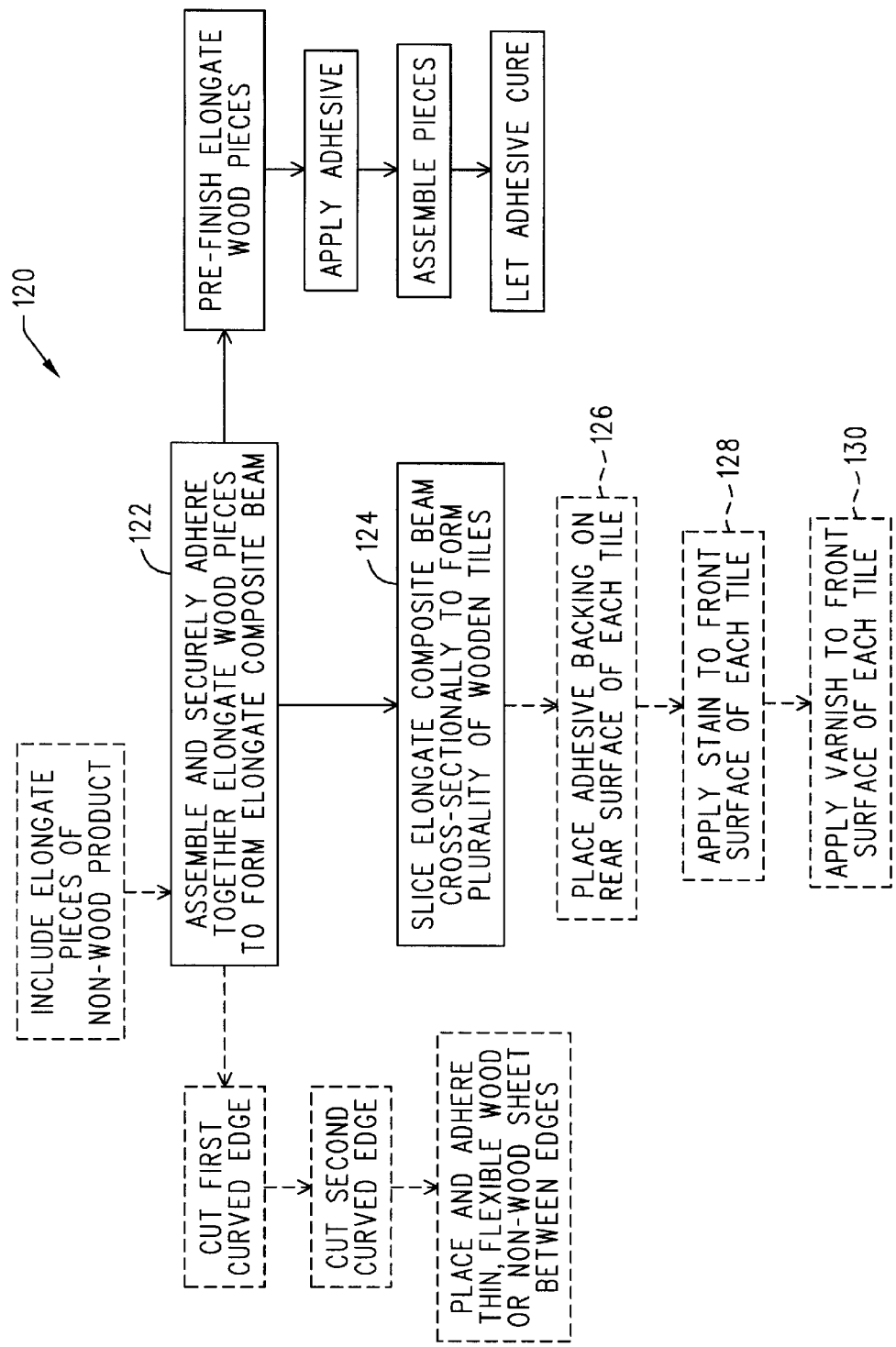
FIG. 11 is a flow chart illustrating a method for making a plurality of wooden tiles from an elongate composite beam.

FIG. 11 is a flow chart illustrating a method 120 for making a plurality of wooden tiles from an elongate composite beam. With reference also to FIGS. 1–10, the method 120 comprises the initial step 122 of assembling and securely adhering together a plurality of elongate wood pieces (e.g., 14*a*–*g*, FIGS. 1–3) to form the elongate composite beam 12 having a rectangular (including square) cross-sectional shape. As indicated by dashed lines, one or more elongate pieces of non-wood product (e.g., 40*a*–*c*, FIG. 4) may also be assembled and adhered along with the elongate wood pieces as desired. This step 122 may involve pre-finishing (e.g., cutting and sanding) each of the elongate wood pieces (e.g., 14*a*–*g*) within a predetermined tolerance such that, when assembled, the elongate wood pieces and non-wood piece(s), if included, form the elongate composite beam 12 having the desired rectangular (including square) shape. Next, an adhesive 16 is applied to some or all of the elongate wood pieces (and may be applied to the non-wood piece(s), if desired) in order to securely adhered the pieces together. Then, the elongate wood pieces (e.g. 14*a*–*g*) and non-wood piece(s), if included, are assembled as demonstrated in FIGS. 1–4 to form the elongate composite beam 12. The adhesive 16 is allowed to completely cure prior to the next step 124, which involves slicing the elongate composite beam 12 cross-sectionally to form the plurality of wooden tiles 10. The beam 12 is sliced using standard wood cutting tools so that each tile has a predetermined, substantially uniform tile thickness "T1". Any small variances in the thickness of the tile may be remedied to a uniform thickness when each tile is lightly sanded as discussed above. The tiles 10 are cross-sectionally sliced from the beam 12 so that each tile has the same rectangular (including square) cross-sectional shape as the beam, with a front surface 30 and a rear surface 32. Each of the front and rear surfaces 30, 32 is substantially comprised of end grain wood, but also may be comprised of non-wood products as discussed above.

In order to create a tile having thin, curved pieces of wood or non-wood product therein as shown in FIG. 10, the step 122 may alternately comprise the following actions. First, a first curved edge (e.g. 112) is cut into a surface on a first one (e.g., 106) of the elongate wood pieces. Then, a second curved edge (e.g., 114) is cut into a surface on a second one (e.g., 108) of the elongate wood pieces. These edges are cut by opposite (male-female) milling heads so that the edges 112, 114 mesh together. Then, a thin, flexible, elongate sheet of wood or non-wood product (e.g., 102) is placed and adhered between the first and second edges 112, 114.

The method 120 may further comprise the step 126 of placing an adhesive backing on the rear surface 32 of each of the wooden tiles 10 to produce a plurality of self-adhesive wooden tiles. The method 120 may further comprise the step 128 of applying a stain and/or the step 130 of applying a varnish to the front surface 30 of each of the wooden tiles 10.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

I claim:

1. A method for making a plurality of wooden tiles from an elongate composite beam, comprising:
    a) assembling and securely adhering together a plurality of elongate wood pieces and at least one elongate piece of decorative, non-wood product which is a thin, flexible sheet, each of said elongate wood pieces having a pre-assembled cross-sectional shape, to form said elongate composite beam having a rectangular cross-sectional shape, whereby said assembling and securely adhering together of said plurality of said elongate wood pieces and said at least one elongate piece of decorative, non-wood product allows each of said elongate wood pieces to substantially maintain said pre-assembled cross-sectional shape; and
    b) slicing said elongate composite beam cross-sectionally to form said plurality of wooden tiles such that each of said wooden tiles has a predetermined, substantially uniform tile thickness and comprises a front surface and a rear surface having a predetermined pattern which is substantially consistent among said wooden tiles and has said rectangular cross-sectional shape of said beam, whereby said front surface is substantially comprised of end grain wood and is also comprised of at least one decorative, non-wood inlay.

2. The method of claim 1 wherein said step of assembling and securely adhering together a plurality of elongate wood pieces and at least one elongate piece of decorative, non-wood product to form an elongate composite beam having a rectangular cross-sectional shape comprises:
    a) pre-finishing each of said elongate wood pieces within a predetermined tolerance such that, when assembled, said elongate wood pieces and said decorative, non-wood product form said elongate composite beam having said rectangular cross-sectional shape;
    b) applying adhesive to at least some of said elongate wood pieces;
    c) assembling said elongate wood pieces and said decorative, non-wood product to form said elongate composite beam having said rectangular cross-sectional shape; and
    d) allowing said adhesive to completely cure.

3. The method of claim 1 wherein said step of assembling and securely adhering together a plurality of elongate wood pieces and at least one elongate piece of decorative, non-wood product to form an elongate composite beam having a rectangular cross-sectional shape comprises:
    a) cutting a first curved edge into a surface on a first one of said elongate wood pieces;
    b) cutting a second curved edge into a surface on a second one of said elongate wood pieces, said second curved edge being the opposite of said first curved edge so that said first curved edge fits into said second curved edge; and
    c) placing and adhering a thin, flexible, elongate sheet of decorative, non-wood product between said first curved edge and said second curved edge.

4. A wooden tile produced by the method of claim 1.

5. The wooden tile of claim 4 having said predetermined tile thickness of between approximately 1/32 inch and 3/4 inch.

* * * * *